United States Patent Office 2,985,917
Patented May 30, 1961

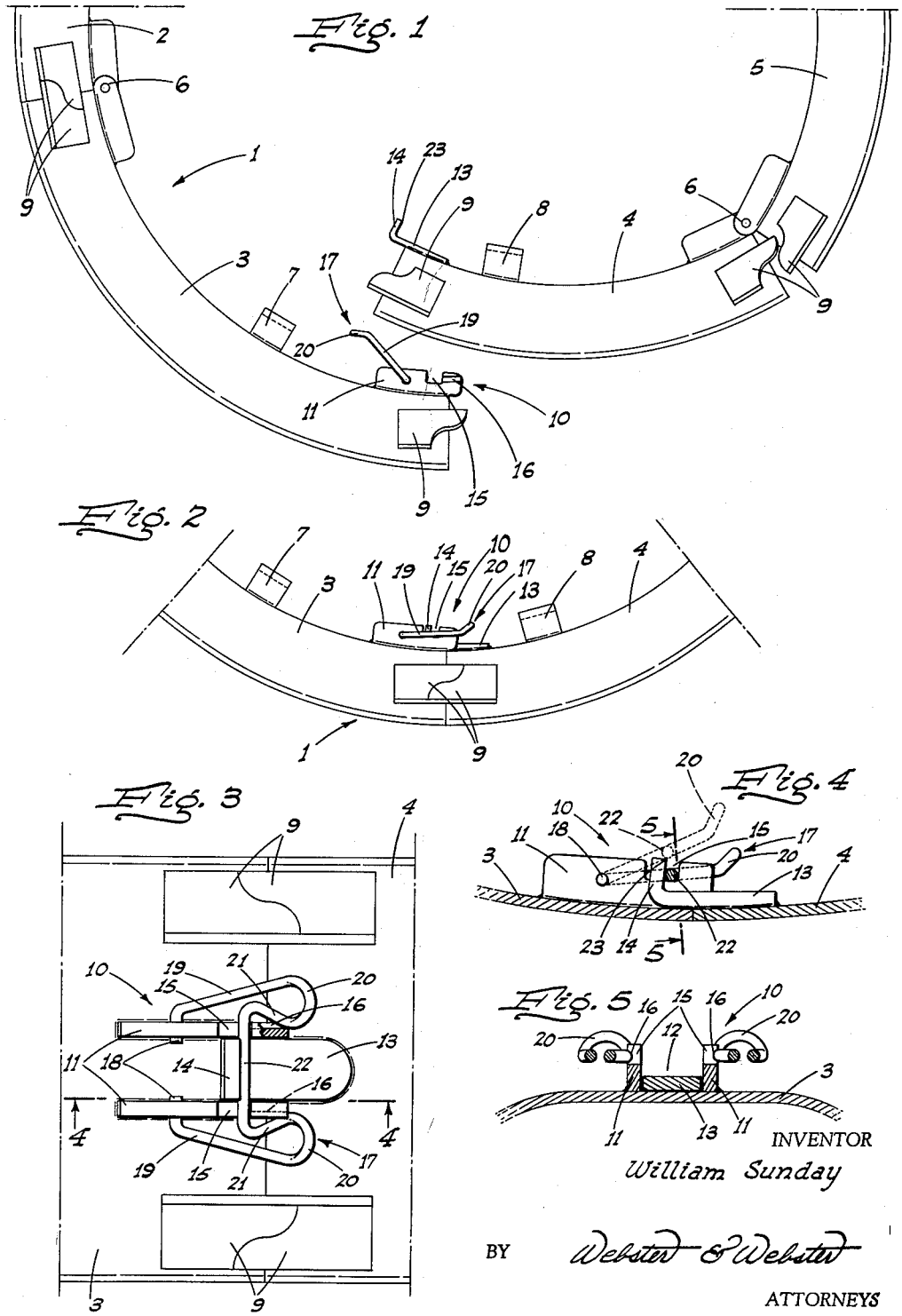

2,985,917
LATCH UNIT FOR INSIDE CURING RIMS
William Sunday, Lodi, Calif., assignor to Super Mold Corporation of California, a corporation of California
Filed May 31, 1960, Ser. No. 32,807
4 Claims. (Cl. 18—43)

This invention relates in general to tire retreading equipment, and in particular is directed to an improved feature of an inside curing rim such as is used in a mold-engaged tire in backing relation to an inflated curing tube or bag in such tire.

The inside curing rim is of annular, multiple-section, foldable type wherein all of the sections, at their adjacent ends, are hinged together except for one pair of sections whose adjacent ends are releasably connected by a latch unit which—when released—permits of folding of the rim for placement in or removal from the tire.

It is the major object of the present invention to provide a novel latch unit, for an inside curing rim, which can be readily and conveniently engaged or released quickly by hand, and yet—when engaged—effectively and positively connects the adjacent and abutting ends of said one pair of rim sections against accidental displacement when the rim is in use in a tire.

Another important object of the invention is to provide a latch unit which—although simple in construction—is practical, reliable and durable.

A further object of the invention is to provide a latch unit which is designed for ease and economy of manufacture.

These objects are accomplished by means of such structure and relative arrangement of parts as will fully appear by a perusal of the following specification and claims.

In the drawings:

Fig. 1 is a fragmentary elevation of an inside curing rim with the latch unit released and one of the released rim sections partially folded.

Fig. 2 is a still more fragmentary elevation of the rim with the latch unit engaged and connecting the adjacent and abutting ends of the related pair of sections, as when the rim is in use.

Fig. 3 is an enlarged plan view—partly broken away—of the latch unit as engaged.

Fig. 4 is a sectional elevation taken on line 4—4 of Fig. 3.

Fig. 5 is a cross section taken on line 5—5 of Fig. 4.

Referring now more particularly to the drawings and to the characters of reference marked thereon, the inside curing rim is indicated generally at 1 and includes multiple sections, certain of which are indicated at 2, 3, 4 and 5. All of the sections except 3 and 4 are connected at adjacent ends by a hinge 6; the sections 3 and 4 being initially separate at adjacent ends but lying in abutment (see Fig. 2) when the rim is unfolded to its annular form and in use in a tire.

In order to place the rim sections 3 and 4 in end to end abutment after the rim is unfolded, and at which time said sections are initially slightly lapped, sockets 7 and 8 are fixed at the back of said sections 3 and 4 intermediate their ends. By the use of a tool (not shown but which engages in the sockets 7 and 8), sections 3 and 4 are sprung apart, and their adjacent ends fall into alined abutment. Also, such sockets and tool are used when it is desired to break the sections 3 and 4 apart preparatory to initiate folding of the entire rim assembly.

The adjacent end portions of all of the rim sections—and on opposite sides thereof—are provided with cooperating locating lugs indicated at 9; corresponding lugs falling into engagement when the rim is unfolded and placed in its annular form for use.

All of the foregoing is substantially conventional, and the present invention is directed to a latch unit employed to maintain the alined abutting ends of the sections 3 and 4 against displacement when the rim is in use; such latch unit being indicated generally at 10.

By reference to the position of the parts when the latch unit together with the sections 3 and 4 are disposed at the bottom of the rim, such latch unit comprises the following:

On the backside thereof—centrally between its sides and adjacent the initially free end thereof—the rim section 3 is provided with a pair of upstanding, longitudinally extending plates 11 secured to section 3 as by welding; such plates being transversely spaced a predetermined distance and parallel to each other.

The plates 11 are of a length and so disposed that their forward end portions project slightly beyond the initially free end of the section 3 and overhang the section 4 when the rim is unfolded and in use.

The upstanding longitudinal plates 11, together with the portion of section 3 therebetween, form a channel indicated at 12.

A substantially flat tongue 13 is fixed, as by welding, to the backside of the section 4 centrally of its sides and adjacent the initially free end of said section; the tongue being of a length and disposed so that its outer end projects beyond the section 4 and laps the near part of the section 3 when the rim is unfolded to its position of use. The tongue then—and for a considerable portion of its length—lies between the upstanding longitudinal plates 11; i.e. in the channel 12 flush against the bottom thereof; the tongue 13 being of a width to fit relatively snugly between said plates 11.

At its free end the tongue 13 is formed with a full width, upturned, hook-like lip 14 which, when the latch is engaged, terminates at its free edge in substantially the plane of the upper edges of the plates 11; such hook being canted slightly, and as shown, in the direction of the forward or outer ends of said plates.

The plates 11 are each formed with a notch 15, cut into the longitudinal free edge of the plate and which notches are transversely alined and disposed so that their forward ends lie somewhat ahead of the hook-like lip 14 when the latter occupies its position in the channel 12.

Additionally, the plates 11—on the outside, and between the notches 15 and the forward ends of said plates—are formed with laterally opening, longitudinal grooves or recesses 16.

A swingable latch yoke, indicated generally at 17, is shaped from a single length of heavy duty spring wire or rod, and such yoke comprises—at its inner end—a pair of inturned, axially alined pivot pins 18 which are received in transverse bores in the plates 11 a distance rearwardly of the notches 15.

Outwardly divergent legs 19 extend from the pivot pins 18 to, and merge with, the laterally outermost ends of half loops 20, and in turn the laterally innermost ends of such half loops merge with outwardly divergent, relatively short, reverse shanks 21. The shanks 21—at the ends opposite the half loops 20—are connected by a cross bar 22 which completes the integral form of the yoke 17.

The half loops 20 are upturned slightly, as shown, for the purpose of ease of finger access.

The elements of the swingable latch yoke 17 are dimensioned, and relatively positioned, so that when the lip 14 is seated in the channel 12 and said yoke is swung from its released upwardly and rearwardly inclined position (as in Fig. 1) forwardly and downwardly to its engaged position (as in Figs. 2 and 3), the following occurs:

Upon the latch yoke 17 being so swung forwardly and downwardly about the pivot pins 18 as an axis, the cross bar 22 first makes contact with—and is sprung by—the upper and forward corner 23 of lip 14. See Fig. 4. Continued movement of the yoke 17 then carries the cross bar 22 to a full seated position in the notches 15 between the forward ends thereof and the face of said lip 14.

At the same time, the shanks 21—substantially at the point of merger with the half loops 20—snap-engage into the grooves 16. This completes the engagement of the latch unit 10, and which can be accomplished readily and quickly by hand. After the latch unit 10 is so engaged, it effectively maintains the sections 3 and 4 in alined abutment and against accidental displacement while the rim is in use.

When it is desired to remove the rim from a tire, the latch unit 10 is released by simply grasping the half loops 20 and pulling upwardly thereon which disengages such yoke both from the grooves 16 and the lip 14; the yoke then being swung further back to its full-released and out-of-the-way position, as in Fig. 1. With the latch unit so released, the sections 3 and 4 can be broken apart in the manner previously described, and the rim then folded for removal from the tire.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A releasable latch unit, between separable but abutting ends of a pair of inside curing rim sections, comprising a longitudinal channel structure on the backside of one rim section adjacent said ends, a tongue on the backside of the other section adjacent said ends and projecting therebeyond into said channel structure, an out-turned lip on the tongue within the channel structure, the latter including a pair of transversely spaced side plates having laterally alined outwardly opening notches therein extending from the lip in the direction of said other section, the lip being canted forwardly and of a height to project beyond the bottom of said notches, there being laterally outwardly opening recesses in the side plates ahead of the notches, and a swingable latch yoke transversely pivoted in connection with the side plates rearwardly of the lip; said yoke latching the channel structure and tongue together for quick release manually and including, in integral relation and from the pivotal axis, laterally outwardly divergent legs normally extending forwardly out from the side plates, inturned half loops on the forward ends of the legs, relatively short laterally outwardly divergent shanks normally extending rearwardly from the half loops at the ends opposite the legs, and a cross bar connecting the rear ends of the shanks; the shanks at substantially the point of merger with the half loops snap-engaging in adjacent recesses, and the cross bar seating in and spanning between the notches in snap engagement with the lip on the forward face thereof.

2. A releasable latch unit between separable but abutting ends of a pair of inside curing rim sections, said unit comprising a pair of transversely spaced side plates mounted on the back side of one rim section adjacent said ends, said plates having laterally alined upwardly opening notches intermediate their ends, a tongue rigid with the other section projecting beyond the ends of the sections and between the plates, a lip rigid with and projecting outwardly from the tongue in rearwardly spaced relation to the forward end of the notches and terminating adjacent the outer edges of the plates, a swingable latch yoke of resilient material pivoted at one end on the plates rearwardly of the notches, said yoke including legs projecting forwardly from the pivoted end laterally out from the plates, and a cross bar connected at its ends to the legs and of a width and in position to project with a snap-fit between the lip and the forward ends of the notches in latching relation; the lip being canted forwardly to its outer end.

3. A latch unit, as in claim 2, in which the cross bar is rearwardly of the forward end of the legs; the connection between the legs and cross bar comprising shanks projecting forwardly from the ends of the cross bar in laterally converging relation to each other, said shanks at their forward ends being normally laterally inwardly of the outer faces of the plates, and loop elements connecting the forward ends of the shanks and legs; the outer faces of the plates being grooved in position to seat the shanks at their forward ends when the cross bar is in a latching position.

4. A releasable latch unit between separable but abutting ends of a pair of inside curing rim sections, said unit comprising a pair of transversely spaced side plates mounted on the back side of one rim section adjacent said ends, said plates having laterally alined upwardly opening notches intermediate their ends, a tongue rigid with the other section projecting beyond the ends of the sections and between the plates, a lip rigid with and projecting outwardly from the tongue in rearwardly spaced relation to the forward end of the notches and terminating adjacent the outer edges of the plates, means including a latch yoke mounted on the plates and engageable with the lip to prevent relative separation of the lip and plates, the outer faces of the plates being recessed, and means included with the yoke to snap-engage in the recesses when the yoke is engaged with the lip.

References Cited in the file of this patent

UNITED STATES PATENTS

| | | |
|---|---|---|
| 2,488,119 | Ferris | Nov. 15, 1949 |
| 2,752,174 | Frost | June 26, 1956 |
| 2,817,877 | Fannen | Dec. 21, 1957 |
| 2,896,288 | Davis | July 28, 1959 |